July 8, 1941.   H. C. SNOW   2,248,134
SYNCHRONIZING MECHANISM
Filed Oct. 26, 1939   3 Sheets-Sheet 1

INVENTOR.
Herbert C. Snow
BY
ATTORNEYS.

July 8, 1941.   H. C. SNOW   2,248,134
SYNCHRONIZING MECHANISM
Filed Oct. 26, 1939   3 Sheets-Sheet 2
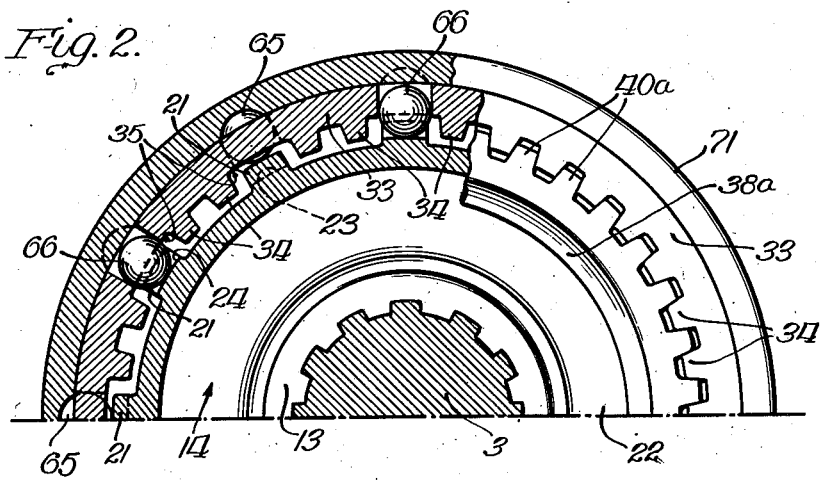
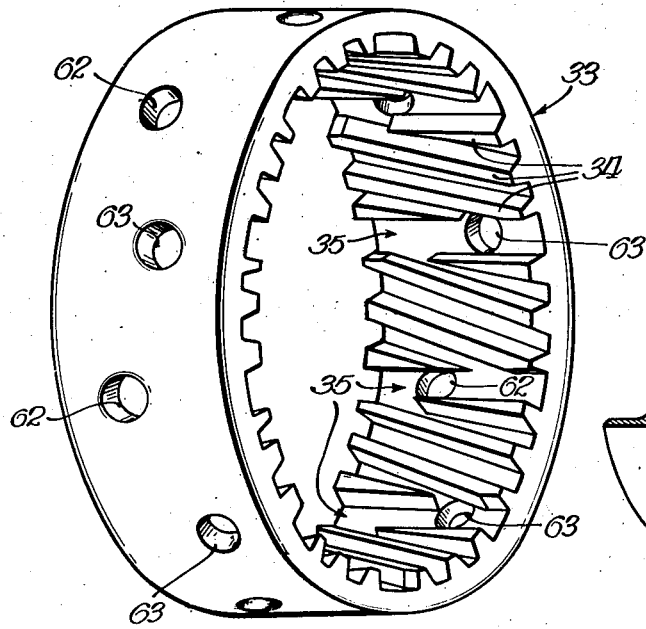
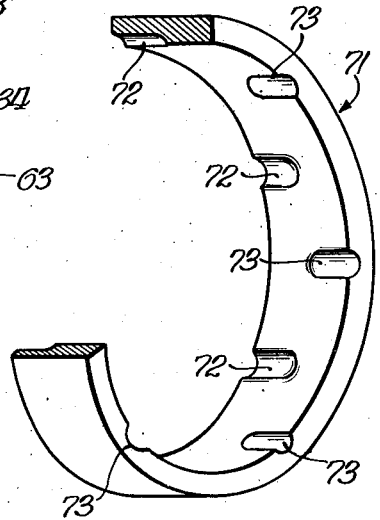
INVENTOR.
Herbert C. Snow
BY Brown, Jackson, Boettcher & Dienner
ATTORNEYS.

July 8, 1941.   H. C. SNOW   2,248,134
SYNCHRONIZING MECHANISM
Filed Oct. 26, 1939   3 Sheets-Sheet 3
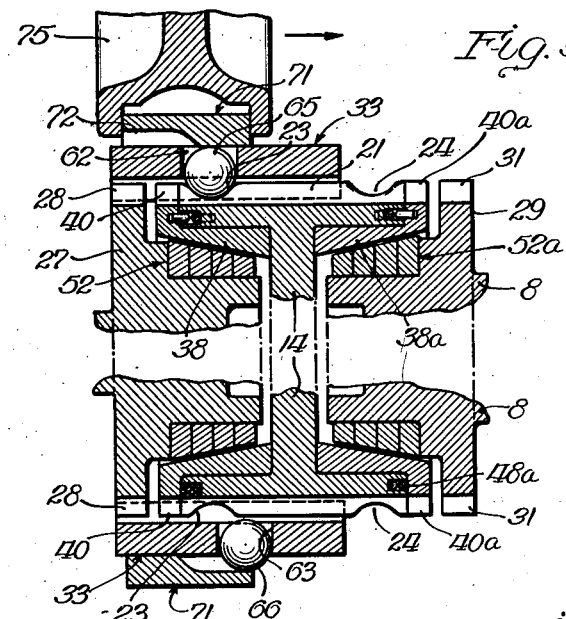
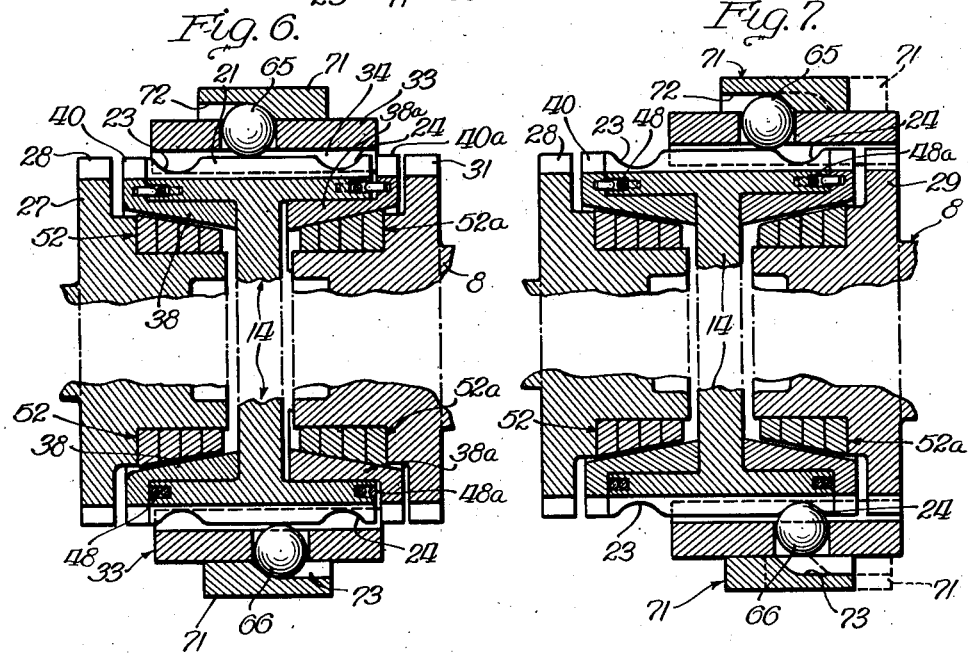
INVENTOR.
Herbert C. Snow
BY
ATTORNEYS.

Patented July 8, 1941

2,248,134

UNITED STATES PATENT OFFICE 2,248,134

SYNCHRONIZING MECHANISM

Herbert C. Snow, Cleveland, Ohio, assignor of one-fourth to Clarence H. Dooley and one-fourth to Delmar D. Dooley, both of Rock Island, Ill., and one-fourth to H. Keith Dooley, Los Angeles, Calif.

Application October 26, 1939, Serial No. 301,367

25 Claims. (Cl. 192—53)

The present invention relates generally to change speed power transmission devices and is more particularly concerned with means for synchronizing the rotation of two relatively rotatable parts so as to enable clutching devices or the like to be engaged with companion devices without clashing or unnecessary wear. Specifically, the present invention is particularly concerned with automobile transmissions wherein, for example, in a three-speed transmission, a shift may be made from high, or direct, to second, or vice versa, easily and conveniently. It is to be understood, of course, that the present invention is not necessarily limited to automobile transmissions or, if incorporated in an automobile transmission, to association with direct or second speed ratios.

The object and general nature of the present invention is the provision of mechanism making it possible to shift from one gear ratio to another without disengaging the main clutch and without causing clash, noise, or unnecessary wear. Generally speaking, it is a feature of this invention to provide a shiftable part in rotatable connection with one member and adapted to be engaged with two relatively movable members, with synchronizing means, and, preferably, but not necessarily, with torque responsive means, whereby a shift under load and without disengaging the main clutch can be performed manually when desired.

Still further, another feature of the present invention is the provision of means blocking the completion of a shift from one ratio to the other until the relatively rotatable parts to be engaged rotate in synchronism, whereupon the blocking means moves into non-blocking position to permit the shift to be completed, manually or otherwise, as desired.

These and other objects and advantages of the present invention will be apparent to those skilled in the art after a consideration of the following detailed description, taken in conjunction with the accompanying drawings, in which:

Figure 2 is a fragmentary end view, partly in section, taken along the line 2—2 of Figure 1 and looking in the direction of the arrows;

Figure 3 is a perspective view of the axially shiftable part which moves in response to torque and an associated manual control;

Figure 4 is a perspective view of the locking ring or sleeve cooperating with other parts to lock the shiftable member in either of its end positions; and Figures 5 to 7 show different positions of the locking means.

Figure 1:
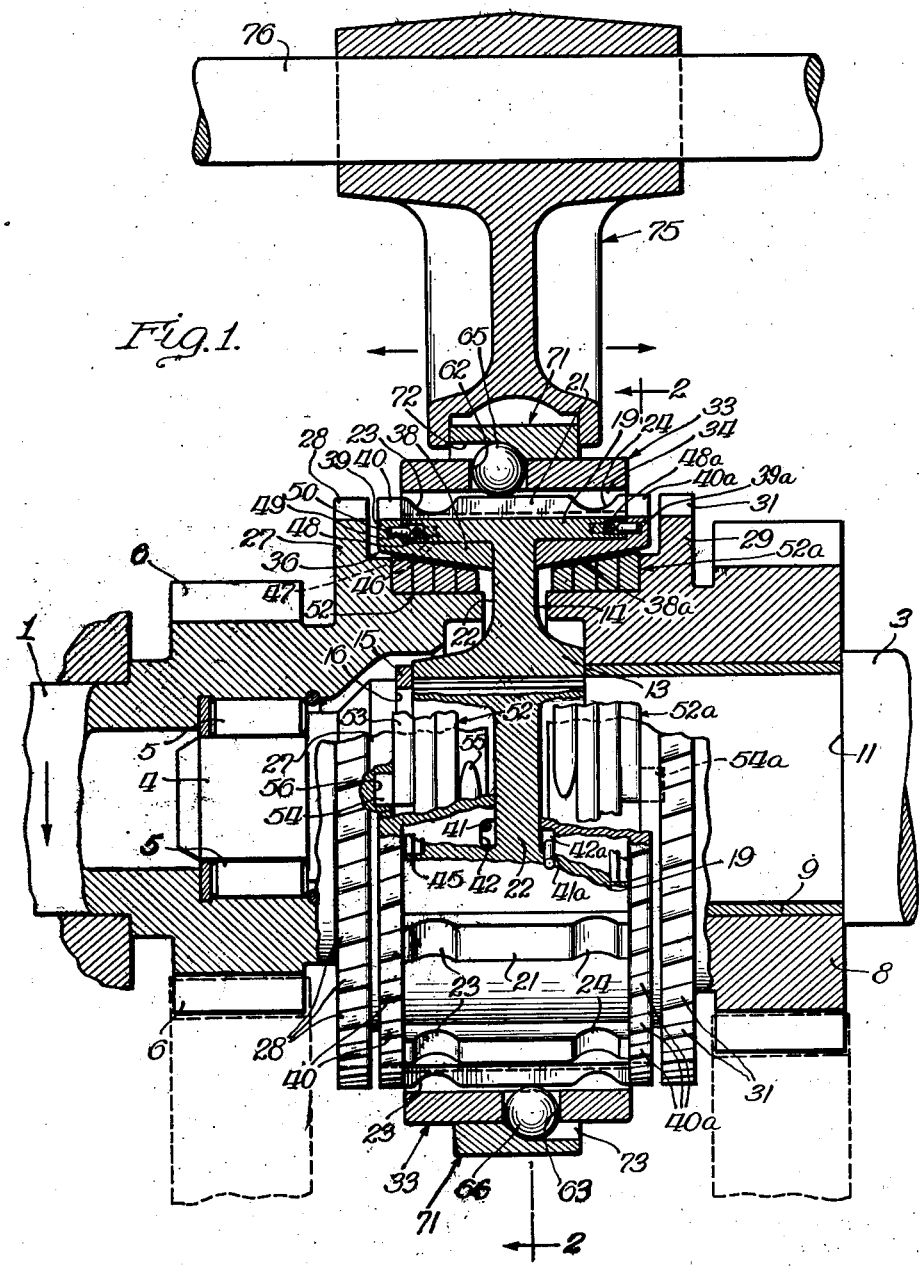
Figure 1 is a fragmentary view of a part of an automobile transmission, showing in particular the synchronizing and shifting mechanism in which the principles of the present invention have been incorporated, certain parts being broken away to show the interior construction.

Referring now more particularly to Figure 1, the transmission in which the present invention has been incorporated includes a driving shaft 1, frequently called the clutch shaft since the driven part of the main automobile clutch is conventionally connected thereto, and a driven shaft 3, the shafts being held in axial alignment and the forward end of the driven shaft 3 being reduced, as at 4, and supported in the rear end of the driving shaft 1 by pilot bearings 5. The driving shaft 1 carries or is formed with a countershaft driving gear 6 with which the driven gear on the countershaft (not shown) is in mesh, and a second gear on the countershaft conventionally meshes with a gear 8 rotatably supported on the driven shaft 3 by any suitable means, such as a bushing 9. The rotatable gear 8 is held on the shaft 3 against axial movement relative thereto in one direction by being disposed up against a shoulder 11 on the shaft 3, and movement of the gear 8 in the other direction is prevented by its engagement with the hub 13 of a member 14 fixed in any suitable manner to the forward end of the driven shaft 3, as by being splined thereon and held in place by a spring ring 15 seating in a groove 16 in the shaft 3 and bearing against the forward edge of the hub 13. If desired, a suitable thrust washer may be disposed between the rear face of the hub 13 and the forward face of the gear 8.

The member 14 is provided with a circumferential portion 19 having a number of axially directed ribs or splines 21, as best shown in the lower portion of Figure 1. A radial web 22 connects the section 19 of the member 14 to the hub 13. The ribs or splines 21 have two sets of recesses 23 and 24 formed therein for a purpose that will be explained below.

A member axially slidable on the splines 21 is adapted to be optionally engaged with the driving shaft 1 or the rotatable gear 8, and to this end complementary toothed clutch sections are formed on or carried by the driving shaft 1 and the gear 8. Also to this end, the countershaft driving gear 6 is provided with an integrally extending radial flange 27, the periphery of which is provided with a set of spiral clutch teeth 28 formed with an angular lead, as shown in Figure 1. A similar clutch section, indicated at 29, is formed on and carried by the gear 8 and likewise is provided with a set of spiral teeth 31 having an angular lead which corresponds to the angularity of the teeth 28, as indicated in Figure 1. The slidable member that is mounted for axial movement on the peripheral portion 19 of the member 14 is indicated in its entirety by the reference numeral 33 and, as best shown in Figure 3, this member is provided interiorly with spline teeth 34 arranged with the same angularity as the teeth 28 and 31 on the clutch sections 27 and 29. However, the teeth 34 are interrupted at a plurality of intervals to provide, in effect, axially extending grooves or recesses 35 having a width to receive the splines 21. By virtue of this construction, therefore, the member 33 is free to slide axially on the member 14, and hence relative to the driven shaft 3, but the member 33 is compelled to rotate at all times with the member 14 and the shaft 3. When the member 33 is in a forward position, as shown in Figure 5, it serves to directly connect the clutch teeth 28 with the splines 21 on the member 14, so that in this position of the member 33 the driving and driven shafts 1 and 3 are connected directly together for rotation at a 1 to 1 ratio. When the member 33 is in its rearward end position it connects the member 14 with the gear 8, which customarily is geared to rotate at a slower rate than the driven shaft 3 itself, through the conventional countershaft gearing, as will be readily understood by those skilled in the art.

According to the principles of the present invention, means is provided for synchronizing the rotation of the driven shaft 3, together with the members 14 and 33 which rotate therewith at all times, with the speed of rotation of the driving shaft 1 or the gear 8, according to which one is to be connected to the driven shaft 3 through the shiftable member 33. As will be seen from Figure 1, the peripheral section 19 is in the form of a drum with axially directed sections overhanging the web 22. The forward synchronizing means, indicated in its entirety by the reference numeral 36, comprises a conical member 38 fitting snugly against the forward portion of the drum or flange 19 and having a radial section 39 formed with teeth 40 having the same angularity as the clutch teeth 28 and 31 and the splines 34 on the interior of the shiftable member 33. A pin 41 is carried by the part 19 and extends into a recess or slot 42 in the member 38 (Figure 1). The length of the slot 42 is just sufficient to limit the angular movement of the cone 38 relative to the member 19 a peripheral distance of one-half the pitch of the teeth 40. The forward flange of the member 19 is provided with an axially extending circumferential slot 45 formed therein, and a small recess 46 receives the inturned end 47 of a coil spring 48 which lies within the slot 45, except for an end 49 which extends outwardly therefrom and fits in a small recess 50 formed in the radially outwardly extending flange 39 of the cone member 38. The spring is arranged normally to hold the member 38 in the position shown in Figures 1 and 2, with the pin 41 at one end of the slot 42 and with the teeth 40 in a position to abut the ends of the spline teeth 34 on the interior surface of the shiftable member 33, when the latter is in an intermediate position, as shown in Figure 1. The slot 42 is constructed to permit a slight amount of axial movement of the cone ring 38, which movement is normally yieldingly opposed by the spring 48 or other suitable means. There may be several pins 41 and associated slots 42, if desired.

The synchronizing mechanism 36 also includes overrunning clutch means in the form of a helically wound spring 52 having its axially forward end 53 anchored to the clutch section 27 by any suitable means, such as a block 54 riveted or otherwise fastened to the end of the spring 52 and seating in a recess 56 formed in the portion of the gear 6 forming the clutch section 27. If desired, of course, one end of the spring 52 may be bent into an axial position to serve as an anchorage lug. As best shown in Figure 1, the other end 55 of the overrunning clutch spring 52 is free and extends in the direction shown. The outer surface of the spring 52 is tapered or conical, so as to receive the conical surface of the synchronizing cone 38. Normally there is a slight clearance between the cone ring 38 and the overrunning clutch spring 52, so that there is no contact between these parts. However, upon a slight forward axial movement of the synchronizing cone 38, as will be explained later, the cone 38 and spring 52 come into engagement, with the latter permitting the drive shaft 1 and clutch section 27 to overrun the cone 38 and member 14 in a forward direction, that is, in the direction of rotation of the motor, indicated by the arrow adjacent the forward end of the shaft 1. In other words, whenever the cone 38 is in engagement with the overrunning clutch spring 52, the shaft 1 may rotate at a greater speed than the shaft 3, but the latter may not rotate any faster than the shaft 1.

The synchronizing mechanism between the gear 8 and the member 14 at the rear portion of the peripheral drum section 19 is of substantially the same construction as the synchronizing mechanism 36 described above, except that the overrunning clutch spring is wound so that when the associated cone is in contact therewith, the shaft 3 and member 14 may overrun the gear 8 in a forward direction, but said gear 8 may drive the cone in that direction, and hence the member 14 and shaft 3, whereby the latter are not permitted to rotate slower than the gear 8. The particular parts of the synchronizing mechanism 58 are given the same reference numbers as the parts of the synchronizing mechanism 36, except that the suffix a has been added.

Reference has been made above to the fact that the interior splines on the shiftable member 33 and the spline teeth 28, 40 and 31, 40a have an angular lead, that is, they are formed as portions of a spiral. As a result of this construction, forward torque, that is, torque to drive the automobile in a forward direction, exerts a tendency to shift the member 33 rearwardly, and driven or coasting torque exerted in the same direction will act through the teeth 31 and 34 to shift the sleeve 33 forwardly.

Accordingly, therefore, in order to drive continuously, or to prevent temporary reversals of torque from effecting disconnection of the drive, it is necessary to provide means for locking the shiftable part 33 against movement axially unless it is actually desired to change the gear ratio. To this end, the shiftable sleeve 33 is provided with two sets of openings 62 and 63 extending through the member 33 (Figure 3) and receiving, respectively, two sets of locking balls 65 and 66. The set 65 of locking balls cooperates with the notches 23 in the axial splines on the part 19, the splines being indicated by the reference numeral 21, the other set 66 of locking balls cooperating with the other notches or recesses 24. Embracing the shiftable member 33 is a locking ring 71, best shown in Figure 4, which is provided with two sets of notches 72 and 73 arranged, respectively, to receive the locking balls 65 and 66. The locking ring 71 is controlled by a shift fork 75 which may be connected to a second and high speed shift rail 76 of the transmission.

It will be noted that the recesses 72 and 73 do not extend axially all the way across the inner surface of the locking ring 71, but terminate approximately half-way. Figures 5, 6 and 7 show, in conjunction with Figure 1, various positions in which the locking ring 71 may be disposed. When the parts are arranged as shown in Figure 5, the interior cylindrical portion of the ring 71 overlies the locking balls 65 and positively holds them in the cooperating recesses 23 in the straight splines of the member 14. Therefore, so long as the locking ring 71 is in this position, the member 33 cannot be moved axially and hence the torque exerted will drive the driven shaft 3 in the usual manner, this being a direct drive relation. If the ring 71 is moved rearwardly, as indicated by the arrow in the upper part of Figure 5, the balls 65 can enter the notches 72, thereby moving out of the recesses 23. At this point the member 33 is permitted to move rearwardly in response to torque, but if torque does not move the member 33 the ends of the slots 73 will engage the other locking balls 66 (Figures 6 and 7) whereby positive movement of the ring 71 in a rearward direction will move the member 33. When the member 33 approaches its rearmost position (Figure 7), the other locking balls 66 can enter the recesses 24, and when the locking ring 71 is moved an additional amount to the rearmost position (as indicated by the dotted lines in Figure 7), the balls 66 will be held in the recesses 24, and hence the shiftable member 33 is again held against axial movement, but in this case it is held in a position effecting second speed, or, in other words, securing the rotatable gear 8 to the shaft 3. The shift rail associated with the fork 75 is shifted manually by the usual form of gear shift lever, or by any other suitable or desired mechanism.

The operation of the present invention is substantially as follows:

Referring to Figure 1, but assuming that the shiftable member 33, the locking ring 71 and the shift fork 75 occupy the positions shown in Figure 5, which locks the part 33 in a position directly connecting the driving and driven shafts 1 and 3 in direct drive, when it is desired to shift into the next lower speed afforded by the gear 8 and the gear reduction means connecting the same to the gear 6 on the driving shaft 1, the shift fork 75 is moved rearwardly, either by a gear shift lever or by any other suitable means, which may be automatic, if desired; the first movement of the shift fork 75 results in moving the ring 71 rearwardly and releasing the locking balls 65, the latter entering the notches 72 on the locking ring 71. The main clutch of the automobile is not disconnected, and the operator continues to depress the throttle so as to insure a flow of power from the driving to the driven parts. This driving torque, transmitted by the spiral splines 28 to the spiral splines 34 on the member 33, and from the latter through the straight splines 21 on the member 14 to the driven shaft 3, results in a rearward movement of the member 33 until it clears the teeth 28. At this point the balls 66 will be engaged by the inner ends of the notches 73, whereby the continued rearward movement of the shift fork 75 results in moving the shiftable member 33 into an intermediate position in between toothed flanges 39 and 39a on the synchronizing cone rings 38 and 38a. As soon as the member 33 clears the teeth 40, the spring 48 shifts the cone 38 into a position where the teeth 40 block the return movement of the shift sleeve 33 in a forward direction, the spring 48a holding the synchronizing cone 38a in a position to block the movement of the part 33 any further to the rear. However, the continued rearward movement of the shift fork 75 by the manual or automatic actuating means results in forcing the member 33 against the teeth 40a, as shown in Figure 6, and shifts the cone 38a slightly rearwardly until it reaches and engages the overrunning clutch spring 52a. At this time, further movement of the member 33 is blocked until the synchronizing cone 38a is moved out of the way.

It will be remembered that, assuming the transmission is a three speed transmission and that the gear 8 is the second speed gear, the latter will be connected, through the usual countershaft arrangement, so as to rotate at a predetermined but slower rate than the drive shaft 1, and the countershaft driving gear 6. Therefore, at the moment the shiftable member 33 became disengaged from the clutch section 27, the driven shaft 3 and the member 14 were rotating at a rate greater than the rotation of the gear 8, both synchronizing cones 38 and 38a rotating with the member 14. At the moment that the synchronizing cone 38a engages the overrunning clutch spring 52a, the latter being wound (as shown in Figure 1) so as to permit the cone 38a to overrun the gear 8, the cone 38a momentarily overruns the gear 8 and spring 52a. However, it will be remembered that the herein described shift is made with the main clutch engaged and under power, hence, as soon as the member 33 became disengaged from the clutch section 27, the motor began to speed up, and therefore the synchronizing cone 38a overruns the clutch spring 52a only until the motor speeds up to the point where the gear 8 reaches synchronism with the driven shaft 3 and the member 14. At this moment, the shiftable member 33 being held up against the blocking teeth 40a on the synchronizing cone 38a, the overrunning clutch spring 52a begins to rotate the synchronizing cone 38a. It requires only an angular movement of a few degrees for this rotation of the synchronizing cone 38a to move the teeth 40a out of blocking position, whereupon the continued force exerted through the shift fork 75 against the shiftable sleeve 33 completes the movement of the latter and shifts the same rearwardly until the teeth 34 of the member 33 mesh with the rear clutch teeth 31, thereby connecting the gear 8 with the driven shaft 3 at the moment that the increasing rate of rotation of the gear 8 brought the same up to the speed of the driven shaft 33. It will be noted that no effort is made to actually force any differently rotatable parts into synchronism, but that there is a momentary halt in the shifting movement of the movable member 33 so as to wait in this position until synchronism is established between the accelerated gear 8 and the driven shaft 3. So far as I am aware, the provision of means of this kind to effect a shift under power but controlled wholly by a manually movable member or some other controlling action, is broadly new. After the part 33 has been moved into complete engagement with the rear clutch section 29, the locking ring 71 is given an additional movement so that the ends of the recesses 73 now move the locking balls 66 into the recesses 24, thereby locking the member 33 against either further rearward axial movement or forward axial movement. Thus, even though the driving connection for this speed is effected through spiral splines or teeth, the resulting axial components are not permitted to move the member 33 axially. Therefore, when the second speed drive is locked, the motor may drive the car or the car may drive the motor without in any way affecting the position of the gears or other parts.

When it is desired to shift from second into high speed, or direct, practically the reverse of the above-mentioned operation is performed. First, the driver closes the throttle so that coasting torque is transmitted back to the motor but in the same rotational direction as the motor drives the driven shaft 3. Next, the operator moves the shift fork 75 forwardly, by any suitable means such as the usual hand gear shift lever, or through some other form of control, which may be automatic. This movement of the fork 75 first releases the locking balls 66 from the recesses 24, the balls being permitted to enter the recesses 73 in the locking ring 71. As best indicated in Figure 1, the angularity of the clutch teeth 31 and cooperating spiral splines 34 on the interior of the shiftable member 33 is such that the coasting torque exerts a force tending to shift the member 33 forwardly, this movement continuing until the member 33 is forced out of engagement with the clutch teeth 31 on the rear clutch section 29. Following this, the continued forward movement of the shift fork 75 causes the ends of the recesses 72 to engage the balls 65, which moves the member 33 into an intermediate position and then up against the blocking teeth 40, which momentarily halts the forward movement of the sleeve 33. The pressure of the shift fork 75 acting through the member 33 against the blocking teeth 40, moves the synchronizing cone 38 forwardly against the overrunning clutch spring 52. Therefore, assuming that the driver has closed the throttle, the deceleration of the driving shaft 1 continues until the synchronizing cone 38 begins to rotate the spring 52. The reaction shifts or rotates the synchronizing cone 38 an angular amount, as permitted by the pin and slot construction 41, 42, which removes the blocking teeth from the path of movement of the member 33, whereupon continued pressure exerted through the shift fork 75 completes the movement of the member 33 back to its direct drive position, as shown in Figure 5. Following this, continued forward movement of the shift fork 75 causes the ends of the recesses 72 to force the balls 65 into a position in the notches 23 until the cylindrical portion of the locking ring 71 embraces the balls 65, thereby locking the member 33 in high speed or direct drive position. Here, again it will be observed that the shift is made without disengaging the main clutch, and in both shifts it will be noted that all that is required of the operator in making one or the other of the shifts is to open or close the throttle, according to whether it is desired to go into the lower or the higher speed, and push against the gear shift lever so as to move the shiftable member 33 into fully engaged position as soon as synchronism is established, continued movement after this time serving to lock the parts in the position to which they are moved.

While I have shown and described above the preferred structure in which the principles of the present invention have been incorporated, it is to be understood that my invention is not to be limited to the particular details shown and described, but that, in fact, widely different means may be employed in the practice of the broader aspects of my invention.

What I claim, therefore, and desire to secure by Letters Patent, is:

1. In a transmission, two axially aligned relatively rotatable clutch elements, a movable torque responsive part disposed between said clutch elements and shiftable in opposite directions into selective clutching positions in engagement with said clutch elements, a member with respect to which said torque responsive part moves from one position to another, releasable means for locking said torque responsive part against movement, and manually operable means for completing the movement of said part into one position after it has been moved out of the other position in response to torque.

2. In a transmission having driving and driven parts, shiftable means movably connected with one of said parts, and a pair of differently rotatable sections operatively connected with the other of said driving and driven parts, means for moving said shiftable means into and out of engagement with one or the other of said differently rotatable sections without declutching, comprising a spiral spline connection between said shiftable means and the associated parts whereby torque transmitted between said driving and driven parts tends to move the shiftable means out of driving connection with one or the other of said rotatable sections, locking means for normally holding said shiftable means against movement, and manual means operative to unlock said shiftable means to permit the same to move axially, under impressed torque, out of either of its positions and to complete the movement of the shiftable means into its other position.

3. In a transmission, a pair of rotatable parts geared together for rotation at different ratios, each of said parts having a toothed clutch section, a companion part rotatable coaxially with respect to said rotatable parts, a shiftable member having a splined connection therewith and toothed portions adapted, respectively, to engage one or the other of said toothed sections on said rotatable parts, and means for synchronizing the rotation of said shiftable means with the rotatable part which said means is to engage, comprising a synchronizing member carried for limited rotational movement with respect to said companion part, and overrunning clutch means acting between said synchronizing member and the associated rotatable part.

4. In a transmission, a pair of differently rotatable parts, a member to be connected optionally therewith, shiftable means slidably connected with said member and adapted to be moved optionally into engagement with one or the other of said rotatable parts, biased means normally held in a position opposing movement of said shiftable means in either direction, and overrunning clutch means serving to connect said biased means with said differently rotatable parts whereby the latter, upon reaching synchronism with said member, serve to move the biased means away from said shiftable means to provide for the completion of movement of the latter into engaged position.

5. In a transmission, a pair of rotatable parts geared together for rotation at different ratios, a member to be connected optionally with one or the other of said parts, shiftable means serving to establish a spiral toothed connection responsive to torque between one or the other of said rotatable parts and said member, whereby driving torque acts to move said shiftable means out of engagement with the faster rotating one of said rotatable parts and coasting torque acts to move said shiftable means out of engagement with the slower rotating one of said rotatable parts, releasable means for locking said shiftable means in one or the other of its positions, and manually controlled means operative to release either of said locking means and to shift said shiftable means out of its intermediate position into engagement with one or the other of said rotatable parts.

6. In a transmission, a pair of differently rotatable parts having toothed portions, a member having a toothed exterior to be connected optionally with said parts, a shiftable member slidably connected with the exteriorly toothed portion of said first-mentioned member and arranged to engage the toothed portions on said rotatable parts, spring biased means at each end of said first-mentioned member and biased for movement into a position blocking axial movement of said shiftable member, and overrunning clutch means acting to move said blocking means out of the path of movement of said shiftable member when said first member moves in synchronism with the one of the rotatable parts towards which the shiftable member is moved.

7. The combination set forth in claim 6, further characterized by said overrunning clutch means comprising a spring associated with each of said rotatable parts and each spring being anchored at one end to the associated part, the other end being free and normally out of engagement with the biased blocking member until the latter is shifted by the engagement therewith of said shiftable member.

8. The combination as defined in claim 6, further characterized by said shiftable member having helically splined torque responsive connection with said rotatable parts, and manually controlled means for optionally locking said shiftable member in a position connecting said first-named member with one or the other of said rotatable parts.

9. The combination set forth in claim 6, further characterized by said shiftable member having an axially splined connection with said first-named member and a helically splined torque responsive connection with said rotatable parts, manually controlled means for locking said shiftable member in engagement with one or the other of said rotatable parts, and means for shifting said shiftable member into engagement with either of said rotatable parts after the shiftable member has been moved, in response to the transmission of torque in one direction or the other, out of engagement with the other rotatable part.

10. Synchronizing mechanism as defined in claim 6, further characterized by said shiftable member having helically splined torque responsive connection with said rotatable parts and a pair of openings therein, locking balls disposed in said openings, said member, with respect to which said torque responsive member moves, having a pair of notches to receive said balls, and a locking sleeve surrounding said movable torque responsive member and shiftable axially with respect thereto into one position, for holding at least one of said locking balls in the associated notch so as to prevent movement of said torque responsive member, and into a second position releasing said ball and permitting the torque responsive member to move in response to the transmission of torque, said sleeve being movable into a third position after the locking ball is moved out of the associated notch for engaging a ball to complete the shifting movement of said torque responsive member into its other position.

11. A transmission for automobiles and the like, comprising a driving part, a driven part, a pair of rotatable parts geared to one of said driving and driven parts so as to rotate at different ratios with respect to each other, a shiftable member having an axially movable splined connection with the other of said driving and driven parts and adapted to be moved from one position to another engaging, respectively, said rotatable parts, and synchronizing means acting between the parts carrying said shiftable member and said rotatable parts, comprising a cone and an overrunning clutch spring of complementary conical circumference disposed between said rotatable parts and the part carrying said shiftable member.

12. A transmission comprising, in combination, driving and driven shafts, a gear rotatable on said driven shaft and geared constantly to said driving shaft to rotate with respect thereto at a predetermined ratio, toothed clutch sections on said driving shaft and said gear, respectively, a driven part fixed to said driven shaft and disposed between said toothed clutch sections, said parts having exterior splines, a shiftable member carried rotatably with said driven part and shiftable axially along the splines thereof into engagement with either one of said toothed clutch sections, and synchronizing means between said driven part and each of said clutch sections, comprising a member having limited movement with said driven part and biased for rotation into a position blocking movement of said shiftable member, and overrunning clutch means connecting said biased member with the associated clutch section, whereby when said shiftable member is disposed in a position between said biased members, movement of the shiftable member cannot be completed until the overrunning clutch means responds to synchronous rotation and shifts the biased member out of the way of said shiftable member to permit the latter to be moved into engagement with the associated clutch section.

13. A transmission as defined in claim 12, further characterized by the connection between said shiftable member and said toothed clutch sections being in the form of helical splines, rendering the shiftable member axially movable under impressed torque, and manually controlled means for locking said shiftable member against movement out of either of its positions and for moving said shiftable member out of neutral position into either of its positions engaging said clutch sections after synchronism between the latter and the driven part has been established.

14. A transmission comprising driving and driven shafts, a gear rotatably mounted on one of said shafts and driven from the other shaft at a predetermined ratio, a pair of axially spaced toothed clutch sections, one carried on the other shaft and the other on said gear, the teeth of said clutch sections having an angular lead, a part fixed to said one shaft, a movable member having an axially shiftable connection with said part and provided with teeth having an angular lead and arranged to be engageable with either of said toothed clutch sections, the angularity of said toothed sections and the teeth on said movable part causing driving torque to move said movable member rearwardly when it is engaged with the toothed section on the other shaft, and coasting torque causing said movable member to move forwardly when it is engaged with the toothed clutch section on said gear, and means operative to prevent said movable member and said part from rotating at a rate outside the ratio of rotation of said other shaft and said rotatable gear.

15. A transmission as defined in claim 14, further characterized by said last mentioned means including a first overrunning clutch means between said movable member and said other shaft, and a second overrunning clutch means between said movable member and said rotatable gear.

16. A transmission comprising driving and driven shafts, a gear rotatably mounted on the driven shaft and driven from said driving shaft at a predetermined ratio, a pair of axially spaced toothed clutch sections, one carried on the driving shaft and the other on said gear, the teeth of said clutch sections having an angular lead, a part fixed to said driven shaft and having a plurality of axially directed splines, a shiftable member provided with interior teeth having an angular lead and arranged to be engageable with either of said toothed clutch sections, said interior splines being interrupted to form axial recesses arranged to receive the splines on said part, the angularity of said toothed sections and said interior teeth causing driving torque to move said shiftable member rearwardly when it is engaged with the toothed section on the driving shaft, and coasting torque causing said shiftable member to move forwardly when it is engaged with the toothed clutch section on said gear, and means operative to prevent said shiftable member from rotating faster than said driving shaft or slower than said rotatable gear.

17. In a transmission, a pair of relatively rotatable parts adapted to be connected together when rotating synchronously, one of said parts carrying an element having a conical surface, and an overrunning clutch spring having one end anchored to the other part and a conical surface adapted to engage the conical surface of said element and said engagement providing means to bring the two parts to a synchronous speed but preventing one part from overrunning the other in at least one direction.

18. In a transmission, a pair of rotatable parts adapted to be connected together in synchronism, one of said parts having a synchronizing element, means connecting said element to said one part for limited relative movement, and an overrunning clutch spring having one end anchored to the other part, said overrunning clutch spring being normally spaced from said synchronizing member until the latter is moved relative to said one part to bring said synchronizing element into engagement with said overrunning clutch spring, and means for moving the synchronizing element relative to said one part.

19. A transmission comprising driving and driven members, a pair of relatively rotatable parts geared together for rotation at a predetermined ratio relative to each other and operatively connected with one of said driving and driven members, a part fixed to rotate with the other of said driving and driven members, a shiftable sleeve, means connecting said sleeve with said last mentioned part, means adapted to connect said sleeve with either of said relatively rotatable parts, one of said connecting means including interengaging helical teeth whereby the transmission of torque tends to cause axial shifting movement of said sleeve and the other connecting means including axially extending teeth accommodating said axial shifting movement, releasable means for holding said sleeve against movement, and means acting against said sleeve after said releasable means has been released for moving said sleeve from one position to the other.

20. A transmission as defined in claim 19, further characterized by said holding means consisting of a set of locking plungers carried by said sleeve and engageable in recesses formed in said fixed part and the means for moving said sleeve comprising another set of plungers carried by said sleeve, and a locking and shifting ring having recesses to receive either set of plungers and a portion to hold the other set of plungers in the associated recesses in said fixed part.

21. In a transmission, the combination of two relatively rotatable clutch elements mounted in axially aligned spaced relation and provided with spiral clutch teeth, an intermediate clutch element mounted between and in alignment with said spaced clutch elements and also provided with spiral clutch teeth, said intermediate clutch element being shiftable axially into and out of clutching engagement with said spaced clutch elements, the clutch teeth on at least one of said clutch elements being formed internally and on at least another of said clutch elements being formed externally, the spiral angle of said clutch teeth rendering said intermediate clutch element shiftably responsive to torque, a member with respect to which said intermediate clutch element shifts from one position to another, releasable locking means for locking said intermediate clutch element against shifting movement, and means for completing the movement of said intermediate clutch element into one position after it has been moved out of the other position in response to torque.

22. In a transmission, the combination of two relatively rotatable clutch elements mounted in axially aligned spaced relation and provided with clutch teeth, an intermediate clutch element mounted between said spaced clutch elements and also provided with clutch teeth, said intermediate clutch element being shiftable axially into and out of clutching engagement with said spaced clutch elements, synchronizing means effective between said spaced clutch elements and said intermediate clutch element, said intermediate clutch element being shiftably responsive to torque, a member with respect to which said intermediate clutch element shifts from one position to another, releasable locking means for locking said intermediate clutch element against shifting movement, and means for completing the movement of said intermediate clutch element into one position after it has been moved out of the other position in response to torque.

23. In a transmission having driving and driven parts, shiftable means movably connected with one of said parts, and a pair of differently rotatable sections operatively connected with the other of said driving and driven parts, mechanism enabling said shiftable means to be moved into and out of engagement with one or the other of said differently rotatable sections without declutching, comprising synchronizing means effective between said differently rotatable sections and said shiftable means, and also comprising a spiral spline connection between said shiftable means and said differently rotatable sections whereby torque transmitted between said driving and driven parts tends to move the shiftable means out of driving connection with one or the other of said differently rotatable sections, locking means for normally holding said shiftable means against movement, and manual means operative to unlock said shiftable means to permit the same to move axially, under impressed torque, out of either of its positions and to complete the movement of the shiftable means into its other position.

24. In a transmission, a pair of rotatable parts geared together whereby one of said parts rotates faster than the other, a member to be connected optionally with one or the other of said parts, shiftable means serving to establish a connection between one or the other of said rotatable parts and said member, said shiftable means comprising helically inclined torque transmitting means whereby driving torque acts to move said shiftable means out of engagement with the faster rotating one of said rotatable parts, and coasting torque acts to move said shiftable means out of engagement with the slower rotating one of said rotatable parts, releasable means for locking said shiftable means in one or the other of its positions, and manually controlled means operative to release said locking means and to shift said shiftable means out of its intermediate position into engagement with one or the other of said rotatable parts.

25. In a transmission, the combination of a pair of relatively rotatable parts, positive clutch means for establishing a positive driving connection between said parts when rotating synchronously, one of said parts carrying an element having a conical surface, and an overrunning clutch spring having one end anchored to the other part and having a conical surface adapted to engage the conical surface of said element, said clutch spring serving to bring the two parts to a synchronous speed but preventing one part from overrunning the other in at least one direction.

HERBERT C. SNOW.